United States Patent
Cords et al.

(10) Patent No.: US 6,843,508 B2
(45) Date of Patent: Jan. 18, 2005

(54) HYDRAULIC DEVICE

(75) Inventors: Karl Cords, Partenstein (DE); Frank Hofmann, Lohr am Main (DE); Peter Lauer, Lohr am Main (DE); Götz-Dieter Machat, Lohr am Main (DE); Karl Meyer, Rieneck (DE); Konrad Schneider, Fellen (DE); Hans Wölfges, Lohr am Main (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/258,562

(22) PCT Filed: Apr. 27, 2001

(86) PCT No.: PCT/EP01/04749

§ 371 (c)(1),
(2), (4) Date: Oct. 24, 2002

(87) PCT Pub. No.: WO01/86157

PCT Pub. Date: Nov. 15, 2001

(65) Prior Publication Data

US 2003/0103832 A1 Jun. 5, 2003

(30) Foreign Application Priority Data

May 12, 2000 (DE) ......................................... 100 23 388

(51) Int. Cl.⁷ ................................................ F16L 35/00
(52) U.S. Cl. .................. 285/148.19; 285/333; 285/390; 411/307
(58) Field of Search ................................ 411/307, 311, 411/411; 285/148.19, 332.3, 333, 390, 334

(56) References Cited

U.S. PATENT DOCUMENTS

| | | | | |
|---|---|---|---|---|
| 597,000 A | * | 1/1898 | Higbee | ......................... 285/333 |
| 1,922,689 A | | 8/1933 | Linnenbruegge | |
| 2,804,928 A | * | 9/1957 | Farrar | ......................... 166/316 |

(List continued on next page.)

FOREIGN PATENT DOCUMENTS

| | | |
|---|---|---|
| DE | 2156623 | 5/1973 |
| DE | 7328919 | 1/1974 |
| DE | 2365132 | 2/1975 |
| DE | 3601389 | 7/1987 |
| DE | 29721155 | 1/1998 |

OTHER PUBLICATIONS

Journal "Industrieranzeiger" Edition 83/88, pp. 24 to 25.

*Primary Examiner*—Eric K. Nicholson
(74) *Attorney, Agent, or Firm*—Martin A. Farber

(57) ABSTRACT

A hydraulic device having a nut part with a threaded hole which has an internal screw thread with a defined nominal diameter and with a defined, uniform pitch, and having a screw part which has an external screw thread with the same nominal diameter as the threaded hole and with a defined, uniform pitch, which is screwed into the threaded hole. (In hydraulic devices, screw parts, in particular nozzle bodies, are generally adhesively bonded in place, in order to prevent them from becoming detached. Adhesive bonding has certain drawbacks, since the screw threads have to be free of grease, and in the case of nozzles there is a risk of blockages, adhesive can enter the hydraulic circuit and also process reliability is not ensured during application.) There is provided a slight difference between the pitch of the internal screw thread of the nut part and the pitch of the external screw thread of the screw part. This slight difference in pitch while the screw part is being screwed in leads to an elastic deformation of a plurality of thread turns, with the result that the screw part is secured so that it cannot become detached.

23 Claims, 2 Drawing Sheets

U.S. PATENT DOCUMENTS

| | | | |
|---|---|---|---|
| 2,870,668 A | | 1/1959 | Flahaut |
| 3,079,181 A | * | 2/1963 | Van Der Wissel .......... 285/333 |
| 4,033,615 A | * | 7/1977 | Miller et al. ................. 285/333 |
| 4,266,590 A | | 5/1981 | Mckewan |
| 4,429,552 A | * | 2/1984 | Reedy .......................... 62/528 |
| 4,582,348 A | * | 4/1986 | Dearden et al. ............. 285/175 |
| 4,603,889 A | * | 8/1986 | Welsh ......................... 285/175 |
| 4,644,974 A | * | 2/1987 | Zingg ........................... 138/44 |
| 4,688,832 A | * | 8/1987 | Ortloff et al. ................ 285/175 |
| 4,770,448 A | * | 9/1988 | Strickland et al. .......... 285/333 |
| 4,796,923 A | * | 1/1989 | Liggins et al. .............. 285/175 |
| 4,840,526 A | | 6/1989 | Bourdonne |
| 4,854,794 A | * | 8/1989 | Oertel ......................... 411/307 |
| 4,958,973 A | | 9/1990 | Sugimura |
| 4,975,147 A | * | 12/1990 | Tahara et al. ................ 156/646 |
| 5,127,784 A | * | 7/1992 | Eslinger ...................... 411/414 |
| 5,186,021 A | * | 2/1993 | Keller .......................... 62/511 |
| 5,221,113 A | | 6/1993 | Stoll |
| 5,419,948 A | * | 5/1995 | Yoshino et al. .............. 411/411 |
| 5,460,875 A | * | 10/1995 | Yoshino et al. .............. 411/411 |
| 5,848,813 A | * | 12/1998 | Albrecht ...................... 285/332 |
| 6,155,613 A | * | 12/2000 | Quadflieg et al. ........... 285/334 |
| 6,213,884 B1 | * | 4/2001 | McCarty ...................... 470/70 |
| 6,442,966 B1 | * | 9/2002 | Wiser .......................... 62/511 |

\* cited by examiner

HYDRAULIC DEVICE

FIELD AND BACKGROUND OF THE INVENTION

The invention is based on a hydraulic device, e.g. on a hydraulic valve or a hydraulic pump, the hydraulic device having a nut part, e.g. a housing or a control piston, with a threaded hole which has an internal screw thread with a defined nominal diameter and with a defined, uniform pitch, and having a screw part, which has an external screw thread with the same nominal diameter as the threaded hole and with a defined, uniform pitch, which is screwed into the threaded hole.

It is known, for example from the journal "Industrieanzeiger", Edition 83/88, pp. 24 to 25, to secure a screw part in a threaded hole by adhesive bonding. To do this, the threads have to be free of grease, dirt and moisture. In hydraulic devices, in which the screw part is very often a nozzle or a closure screw, which generally has to be exchanged or released and refitted from time to time, the measures required in order to secure the screw part used in an exchange of this type are very laborious, since it is difficult to keep the threads free of grease or to remove grease and hydraulic oil which have penetrated into the gap between the threads while the hydraulic device is operating. A further drawback is that when the screw part is being screwed into the threaded hole adhesive can flow away or be shaved off and passes into the hydraulic circuit in which the hydraulic device is located. This contaminates the hydraulic fluid which is used. Particularly if the screw part is a nozzle, there is a risk of the nozzle bore becoming blocked by applied adhesive. Overall, securing a screw by adhesive bonding is laborious, not a very reliable process and is also not clean.

SUMMARY OF THE INVENTION

The invention is therefore based on the object of developing a hydraulic device having the features described in the introductory-mentioned paragraph such that the screw part is secured in the threaded hole in a simple manner without the use of adhesive.

In a hydraulic device in accordance with the introductory-mentioned paragraph, the desired object is achieved, according to the invention, wherein there is a slight difference between the pitch of the internal screw thread of the nut part and the pitch of the external screw thread of the screw part. The difference is selected taking account of the thread turns which engage in one another after the screw part has been screwed in, in such a way that individual turns are deformed not permanently but rather elastically. These elastically deformed turns cause the external and internal screw threads to be elastically clamped together, so that the screw part is secured by the forces exerted by the elastically deformed turns.

Although it is known, for example, from U.S. Pat. No. 4,266,590, 2,870,668 or 1,922,689 to provide the nut part of a threaded connection with a different pitch than the screw part, in a hydraulic device this particular type of screw connection has not hitherto been employed despite the considerable inadequacies of the conventional adhesive-bonding processes.

Advantageous configurations of a hydraulic device according to the invention can be found herein.

For example, as has already been indicated, securing a screw by using different pitches of the internal screw thread and the external screw thread is highly advantageous in particular wherein the screw-in part is a nozzle body in which there is a risk of a blockage if adhesive is used.

In accordance with a feature of the invention the difference between the pitch of the nut part and the pitch of the screw-in part is preferably in the range from 15% to 10% of a mean formed from the two pitches.

Nozzles have hitherto been made primarily from brass, a material in which it is relatively easy to bore holes with a very small diameter of between 0.5 and 1.5 mm. However, brass is relatively inelastic. Moreover, especially with the different pitches between the internal screw and the external screw thread according to the invention used to clamp the screw threads together, particles may be shaved off, pass into the hydraulic fluid and contaminate the latter. Therefore, in another particularly advantageous configuration of a hydraulic device according to the invention, the screw-in part is made of a steel, in particular of a free-machining steel. This steel has a high elasticity and can also be machined easily.

Hitherto, screw parts which have a screw shank, which bears the external screw thread, and a screw head and have been screwed into the nut part until the head part comes to bear against the nut part, have been used for hydraulic devices. If, in accordance with the invention, the screw threads are provided with different pitches, thread turns are quickly plastically deformed beyond the elasticity limit if the screw part is rotated further beyond the time when contact is made between the screw head and the nut part. This causes the securing of the screw to be lost. Therefore, according to still another feature of the invention it is provided that, to limit the screwing-in movement of the screw-in part, one of the two screw threads has a run-out section in which the depth of the thread groove decreases continuously. As soon as the mating screw thread engages in the run-out section of the screw thread, the torque required to screw in the screw increases greatly without permanent deformation at least of the thread turns located outside the run-out section. In order on the one hand not to give the fitter the feeling that he has to screw in the screw part so far that a screw head bears against the nut part and, on the other hand, in order nevertheless to be able to provide the screw part with a larger screw head, it is provided, according to yet still another feature of the invention the head, starting from the shank, has a diameter which increases over a defined axial length. According to still another feature this increase preferably takes place in the form of a truncated cone.

In another particularly preferred configuration, the internal screw thread of the nut part and the external screw thread of the screw-in part, in particular the external screw thread of a nozzle, are metric screw threads with a diameter of 4 mm, the pitch of the first thread, preferably the pitch of the internal screw thread, is 0.7 mm, and the pitch of the second screw thread differs by 0.05 mm from the pitch of the first screw thread, and the engagement length between the two screw threads is approximately 4 mm. According to still a further feature of the invention it is preferable for the screw-in part to be hardened on its surface and, according to another preferable feature the screw-in part can be provided with an oxidation-resistant layer which protects against rust.

BRIEF DESCRIPTION OF THE DRAWING

An exemplary embodiment of a hydraulic device according to the invention, which is designed as a pilot-control pressure control valve, is illustrated in the drawings. The invention will now be explained in more detail with reference to the figures in these drawings, in which.

DETAILED DESCRIPTION OF THE PREFERRED EMBODIMENT

Figure 1:
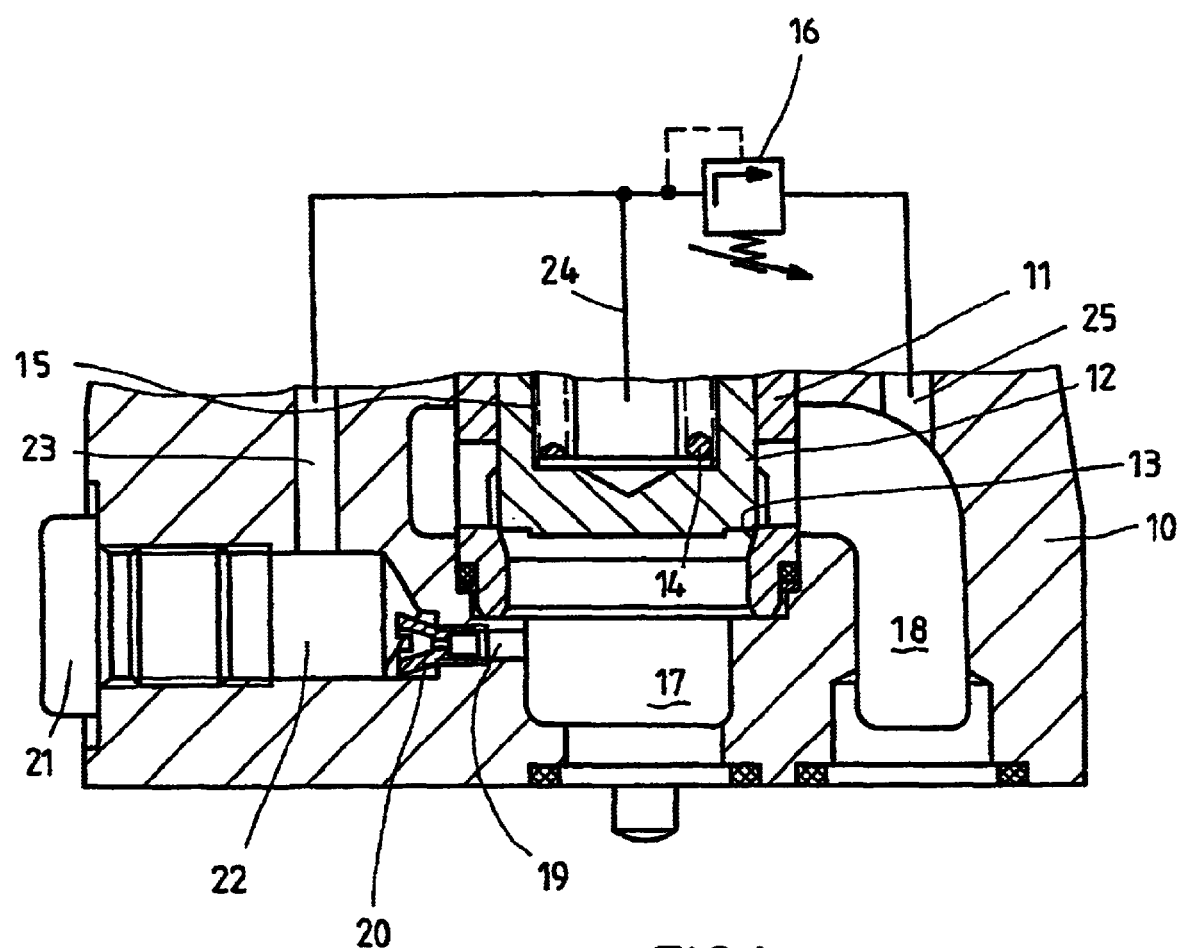
FIG. 1 shows an excerpt from the main stage of the pressure control valve according to the invention, in which a nozzle as screw part is screwed into the housing as nut part.
Figure 2:
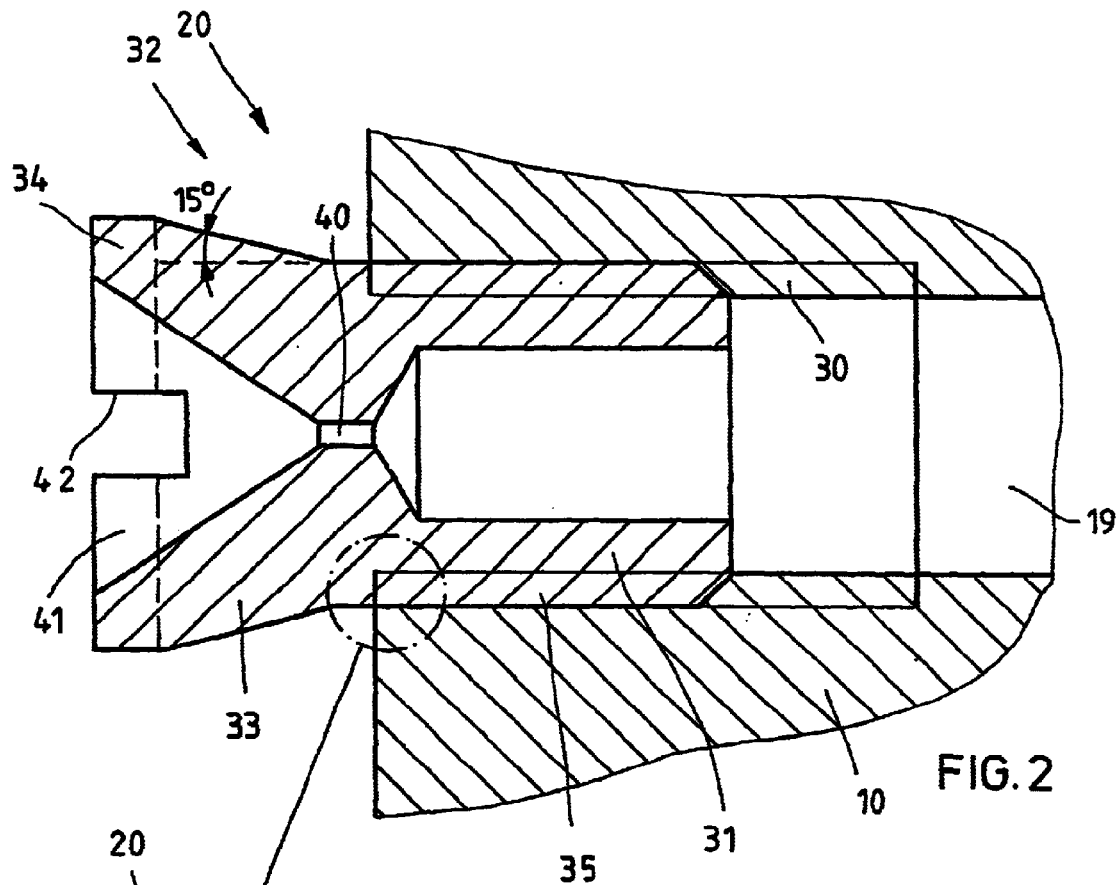
FIG. 2 shows an enlarged illustration of the region from FIG. 1 in which the nozzle is located.

In the pressure control valve shown, a bore in a cast iron housing 10 securely holds a sleeve 11 in which a main cone 12 is guided and on which a seat 13 for the main cone is formed. The main cone 12 is loaded toward the valve seat 12 by a relatively weak compression spring 14 which is located in a rear control space 15, which is filled with control oil. The housing (not shown in more detail) of the pilot valve 16, only the circuit symbol of which is illustrated, is seated on the housing 10. Any design details of the pressure control valve which are not shown further can be found in the applicant's data sheet RD 25 802/01.99.

The pressure which is to be controlled is present in an entry passage 17 to the housing 10 and at that end side of the main cone 12 which faces this passage. When the cone lifts off the seat 13, pressurized liquid can flow from the entry passage 17, through the end-side opening and through radial bores in the sleeve 11, into an exit passage 18 of the housing 10 and, from there, to a tank.

Passages which are part of a control-oil flow path also run in the housing 10. A control bore 19, which leads radially from the entry passage 17, into which a control-oil nozzle 20 is screwed and which merges eccentrically into a larger transverse bore 22, which is closed off with respect to the outside by a stopper 21, lies in the inlet to the pilot valve 16. In turn, a bore 23, which runs parallel to the axis of the sleeve 11, leads from the transverse bore 22 to the entry to the pilot valve 16. The control space 15 is also connected to this entry via a line 24. A line, in which a bore 25 of the housing 10 running parallel to the sleeve 11 also belongs, leads from the exit of the pilot valve into the exit 18 of the housing 10.

Therefore, when the pilot valve 16 is closed, the same pressure prevails above the control-oil nozzle 20 in the control space 15 behind the main cone 12 as in the entry 17. The spring 14 therefore holds the main cone 12 closed. If the pressure in the entry 17 rises to the value set at the pilot valve 16, the latter opens and control oil can flow out of the control space 15 via the pilot valve 16 into the exit 18. The pressure in the entry 17 still rises slightly by the pressure equivalent of the compression spring 14 and is then held at this value by a corresponding opening cross section between the sleeve 11 and the main cone 12. A control-oil stream, which is determined by the opening cross section of the nozzle and the pressure equivalent of the pressure spring 14, which is in the region of a few bar, flows via the control-oil nozzle 20.

The nozzle 20 is screwed into the bore 19. For this purpose, this bore is provided over a certain distance, from the larger transverse bore 22, with a metric internal screw thread which has a nominal diameter of 4 mm and a pitch of 0.70 mm. In short, the person skilled in the art would say that the internal screw thread is an M4×0.70 thread.

Figure 3:
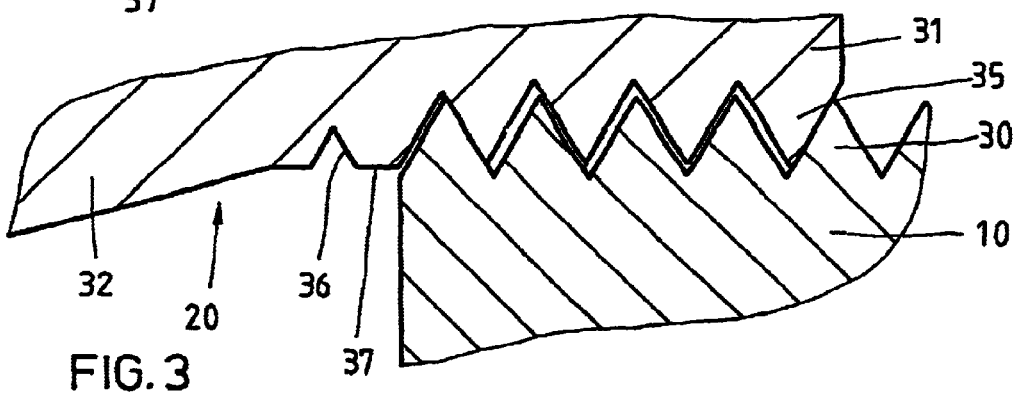
FIG. 3 shows an excerpt from FIG. 2 which has been enlarged still further and clearly illustrates the engagement between the screw threads.

The nozzle or, more specifically, the nozzle body 20 has a screw shank 31 and a screw head 32, the diameter of which, starting from the screw shank, initially increases linearly, in the manner of a truncated cone, with an included angle of 30°, and then remains constant over a short section. Therefore, at the screw head 32 it is possible to distinguish between a frustoconical section 33 and a cylindrical section 34. On the screw shank, the nozzle body 20 bears an external screw thread 35 which, like the internal screw thread 30, is an M4 thread, the pitch of which, however, is not 0.70 mm, but rather 0.75 mm, i.e. slightly greater than the pitch of the internal screw thread 30. As is clearly apparent, the screw shank and screw head merge into one another without a recess between them. Accordingly, the screw thread 35 also does not end in a recess. Rather, at a short distance from the head 32 the thread groove becomes gradually less deep and ultimately ends completely in the shank 31. This is achieved as a result of the fact that, during the cutting of the thread, the cutting tool is drawn back in the radial direction as it continues to rotate and as the axial movement of the nozzle body continues. FIG. 3 shows how the thread groove 36 has become shallower close to the head 32; while the cutting tool is being pulled out, the speed of axial movement of the nozzle body is the same as during the cutting of the screw thread ahead of the run-out section, so that even in the run-out section there is the same distance between the thread turns as in the regular part of the screw thread. The thread end is then not pointed but rather flat in the run-out section, as can be seen at 37 from FIG. 3.

Figure 4:
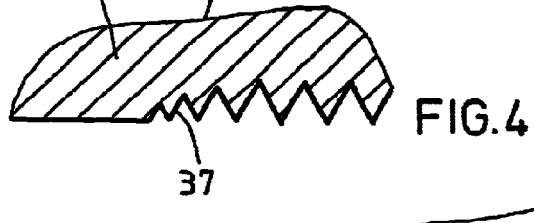
FIG. 4 shows an alternative to the design of the run-out section of the screw thread of the nozzle which can be seen in FIG. 3.

It is also possible, during cutting of the screw thread in the run-out section, to reduce the speed of the axial movement of the nozzle body 20. In this case, as can be seen from FIG. 4, the thread end 37 remains pointed, but the axial distance between two thread turns is reduced in the run-out section.

The result of the difference between the pitch of the internal screw thread 30 and of the external screw thread 35 is that when the nozzle body 20, which can be referred to as the screw part, is being screwed into the bore 19, which can be referred to as the threaded hole, the front thread turn only bears against a location on a turn of the internal screw thread if a certain pressure is exerted on the nozzle body 20 while it is being screwed in. Without this pressure, the rear thread turn of the nozzle body 20 which is in engagement with the internal screw thread 30 bears against a location on the internal screw thread 30. When the nozzle body 20 has been screwed far enough into the bore 19, a further thread turn comes into contact—albeit by means of the opposite flank—with a flank of the internal screw thread 30. This state is illustrated in FIG. 3. It can be seen that the thread turn of the nozzle body 20 which has been screwed in furthest is in contact with a corresponding turn of the internal screw thread 30 by means of the inwardly facing flank, and the last turn of the nozzle body 20 which is in engagement bears against a corresponding turn of the internal screw thread 30 by means of the outwardly facing flank. If the nozzle body 20 is then rotated further, the turns which are in contact with one another are elastically deformed, and the nozzle body 20 and the housing 10 are clamped together, during which process further thread turns can come into contact with one another. With the thread dimensions and pitches which have been given, this takes place at a thread length of approximately 4 mm. As soon as the situation shown in FIG. 3 is in existence, or just before this time or just after this time, the internal screw thread 30 passes into the run-out section of the external screw thread 35, so that when the nozzle body 20 is rotated further, the torque required rises considerably and the rotation of the nozzle body is deliberately ended before regular thread turns which engage with one another are permanently deformed beyond the elasticity limits of the materials. In the run-out section there is a certain permanent deformation of the thread turns, which additionally contributes to securing the screw part in the threaded hole.

The particular shape of the head 32, the greater diameter of which is required in order to enable a conical widening 41, which influences the flow characteristics of the control oil, to adjoin the actual nozzle bore 40 and to allow introduction of the slot 42, does not allow the fitter to feel that he has to screw in the nozzle body 20 all the way to an axial stop and then tighten it with a high torque, which would entail the risk of permanent deformation to the thread turns.

The nozzle body 20 is made of a free-machining steel which has good elastic properties yet can nevertheless be machined easily in order in particular to be able to drill the very small nozzle bore 40. At its surface, the nozzle body 20 is hardened, in particular by carbonitriding, so that there is a low risk of particles being shaved off when the thread turns are being screwed in and possibly passing into the hydraulic circuit. Moreover, the nozzle body 20 is provided with an oxidation-esistant layer on its surface.

What is claimed is:

1. A hydraulic valve having a nut part (10) with a threaded hole (19) which has an internal screw thread (30) with a defined nominal diameter and with a defined, uniform pitch, and having a screw part (20) which has an external screw thread (35) with the same nominal diameter as the threaded hole (19) and with a defined, uniform pitch, which is screwed into the threaded hole (19) wherein there is a light difference between the pitch of the internal screw thread (30) of the nut part (10) and the pitch of the external screw thread (35) of the screw part (20), further wherein the screw part (20) defines a fluid flow passage there through wherein the screw part (20) has a shank (31) which bears the external head (32) and a head (32), in which the diameter of the screw part (20) is greater than in the shank (31), and wherein the bead (32) starting from the shank (31), increases in diameter over a defined axial length.

2. The hydraulic valve as claimed in claim 1, wherein the screw part (20) is a nozzle body.

3. The hydraulic valve as claimed in claim 1, wherein the difference between the pitch of the nut part (10) and the pitch of the screw part (20) is in the range from 5% to 10% of a mean formed from the two pitches.

4. The hydraulic valve am claimed in claim 1, wherein the screw part (20) is made of steel.

5. The hydraulic valve as claimed in claim 1, wherein to limit screwing-in movement of the screw part (20), one of the two screw threads (30, 35) has a run-out section in which depth of its thread groove (36) decreases continuously.

6. The hydraulic valve as claimed in claim 5, wherein the external screw thread (35) of the strew part (20) has the run-out section.

7. The hydraulic valve as claimed in claim 1, wherein the diameter increases linearly to form a truncated cone (33), wherein an included angle of the truncated cone (33) is substantially 30y.

8. A hydraulic valve having a nut part (10) with a threaded hole (19) which has an internal screw thread (30) with a defined nominal diameter and with a defined, uniform pitch, and having a screw part (20) which has an external screw thread (35) with the same nominal diameter as the threaded hole (19) and with a defined, uniform pitch, which is screwed into the threaded hole (19), wherein there is a slight difference between the pitch of the internal screw thread (30) of the nut part (10) and the pitch of the external screw thread (35) of the screw part (20), further wherein the screw part (20) defines a fluid flow passage there through wherein the internal screw thread (30) of the nut part (10) and the external screw thread (35) of the screw part (20) are metric screw threads with a diameter of 4 mm, wherein the pitch of a first of the screw threads, the pitch of the internal screw thread (30), is 0.7 mm, and the pitch of a second of the screw threads, the pitch of the external screw thread (35), differs by 0.05 mm from the pitch of the first screw thread, and wherein engagement length between the two screw threads (30, 35) which is determined by a shorter (35) of the two screw threads, is approximately 4 mm.

9. The hydraulic valve as claimed in claim 1, wherein the screw part (20) is hardened on its surface.

10. The hydraulic valve as claimed in claim 1, wherein the screw part (20) on its surface has an oxidation-resistant layer.

11. The hydraulic valve am claimed in claim 4, wherein the screw part (20) is made of a free machining steel.

12. The hydraulic valve as claimed in claim 9, wherein the screw part (20) is hardened on its surface by carbonitriding.

13. A hydraulic pump having a nut part (10) with a threaded hole (19) which has an internal screw thread (30) with a defined nominal diameter and with a defined, uniform pitch, and having a screw part (20) which has an external screw thread (35) with the same nominal diameter as the threaded hole (19) and with a defined, uniform pitch, which is screwed into the threaded hole (19), wherein there is a slight difference between the pitch of the internal screw thread (30) of the nut part (10) and the pitch of the external screw thread (35) of the screw part (20)

wherein the screw part (20) has a shank (31) which bears the external screw thread (35) and a head (32), in which the diameter of the head (32) is greater than in the shank (31), and wherein the head (32) starting from the shank (31), increases in diameter over a defined axial length.

14. The hydraulic pump as claimed in claim 13, wherein the screw part (20) is a nozzle body.

15. The hydraulic pump as claimed in claim 13, wherein the difference between the pitch of the nut part (10) and the pitch of the screw part (20) is in the range from 5% to 10% of a mean formed from the two pitches.

16. The hydraulic pump as claimed in claim 13, wherein the screw part (20) is made of steel.

17. The hydraulic pump as claimed in claim 13, wherein to limit screwing-in movement of the screw part (20), one of the two screw threads (30, 35) has a run-out section in which depth of its thread groove (36) decreases continuously.

18. The hydraulic pump as claimed in claim 17, wherein the external screw thread (35) of the screw part (20) ham the run-out section.

19. The hydraulic pump claimed in claim 13, wherein the diameter increases linearly to form a truncated cone (33), wherein an include angle of the truncated cone (33) is substantially 30y.

20. The hydraulic pump as claimed in claim 13, wherein the screw part (20) is hardened on its surface.

21. The hydraulic pump as claimed in claim 13, wherein the screw part (20) on its surface has an oxidation-resistant layer.

22. The hydraulic pump as claimed in claim, 16 wherein the screw part (20) is made of a free-machining steel.

23. The hydraulic pump as claimed in claim 20, wherein the screw part (20) is hardened en its surface by carbonitriding.

* * * * *